United States Patent
O

(10) Patent No.: US 12,483,059 B2
(45) Date of Patent: Nov. 25, 2025

(54) ELECTRONIC DEVICE FOR BATTERY CHARGING BASED ON INTERNAL TEMPERATURE

(71) Applicant: SAMSUNG ELECTRONICS CO., LTD., Suwon-si (KR)

(72) Inventor: Changhak O, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 714 days.

(21) Appl. No.: 17/748,125

(22) Filed: May 19, 2022

(65) Prior Publication Data

US 2023/0055574 A1 Feb. 23, 2023

Related U.S. Application Data

(63) Continuation of application No. PCT/KR2022/006251, filed on May 2, 2022.

(30) Foreign Application Priority Data

Aug. 12, 2021 (KR) .......................... 10-2021-0106468

(51) Int. Cl.
H02J 7/00 (2006.01)

(52) U.S. Cl.
CPC .... *H02J 7/007192* (2020.01); *H02J 7/00309* (2020.01); *H02J 7/0047* (2013.01)

(58) Field of Classification Search
CPC ................................................ H02J 7/007192
(Continued)

(56) References Cited

U.S. PATENT DOCUMENTS 11,303,126 B1 * 4/2022 Staver ................... H10D 89/60
2006/0082346 A1 4/2006 Nagasawa
(Continued)

FOREIGN PATENT DOCUMENTS

| CN | 111211595 A | 5/2020 |
| CN | 111342513 A | 6/2020 |

(Continued)

OTHER PUBLICATIONS

International Search Report for International Application No. PCT/KR2022/006251; International Filing Date May 2, 2022; Date of Mailing Aug. 16, 2022; 8 Pages.
(Continued)

*Primary Examiner* — Yalkew Fantu
(74) *Attorney, Agent, or Firm* — CANTOR COLBURN LLP

(57) ABSTRACT

An electronic device may include a power management circuit (PMC) configured to charge a battery using a power signal, a processor connected to the PMC, and a memory connected to the processor. The memory may store instructions that, when executed, cause the processor to identify that an internal temperature of the electronic device increases to a first temperature while a current power signal value is a first charging current, configure the current power signal value to a thermal control current lower than the first charging current as the internal temperature increases to the first temperature, identify that the internal temperature decreases to a second temperature while the current power signal value is the thermal control current, and configure the current power signal value to a second charging current lower than the first charging current but higher than the thermal control current as the internal temperature decreases to the second temperature.

20 Claims, 12 Drawing Sheets

(58) Field of Classification Search
USPC .......................................................... 320/150
See application file for complete search history.

(56) References Cited

U.S. PATENT DOCUMENTS

| | | | |
|---|---|---|---|
| 2007/0013345 A1 | 1/2007 | Ikeda et al. | |
| 2013/0120630 A1 | 5/2013 | Kim et al. | |
| 2014/0097788 A1 | 4/2014 | Kim et al. | |
| 2015/0028809 A1 | 1/2015 | Nishikawa et al. | |
| 2015/0248135 A1* | 9/2015 | Han | G05F 1/462 307/31 |
| 2017/0366035 A1* | 12/2017 | Meng | H01M 10/4257 |
| 2018/0097369 A1 | 4/2018 | Madhavi et al. | |
| 2018/0262017 A1 | 9/2018 | Hsu et al. | |
| 2018/0262043 A1 | 9/2018 | Yi et al. | |
| 2020/0185950 A1 | 6/2020 | Jeong et al. | |
| 2021/0218263 A1* | 7/2021 | Sun | H01M 10/443 |

FOREIGN PATENT DOCUMENTS

| | | |
|---|---|---|
| JP | 2010172158 A | 8/2010 |
| KR | 20140044105 A | 4/2014 |
| KR | 20180019202 A | 2/2018 |
| KR | 20180103629 A | 9/2018 |
| KR | 102078093 B1 | 2/2020 |
| KR | 20200070630 A | 6/2020 |
| KR | 20200091539 A | 7/2020 |
| KR | 20210051774 A | 5/2021 |

OTHER PUBLICATIONS

Extended European Search Report Issued In EP Application No. 22855961.3-1002, Mail Date Nov. 12, 2024, 34 Pages.

* cited by examiner

ELECTRONIC DEVICE FOR BATTERY CHARGING BASED ON INTERNAL TEMPERATURE

CROSS-REFERENCE TO RELATED APPLICATION(S)

This application is a continuation application, claiming priority under § 365(c), of an International application No. PCT/KR2022/006251, filed on May 2, 2022, which is based on and claims the benefit of a Korean patent application number 10-2021-0106468, filed on Aug. 12, 2021, in the Korean Intellectual Property Office, the disclosure of which is incorporated by reference herein in its entirety.

TECHNICAL FIELD

This disclosure relates to charging a battery of an electronic device based on an internal temperature of the electronic device.

BACKGROUND ART

An electronic device may use constant current (CC) and constant voltage (CV) charging profiles when charging a battery to extend the life of the battery and to reduce charging time. For example, when the voltage of the battery is lower than a specified target voltage value, the electronic device may charge the battery by constantly maintaining the current of a power signal output from a power management circuit (e.g., a charging circuit) to the battery at a specified current value (hereinafter, "charging current value"). The target voltage value may be the same as the voltage difference between positive (+) and negative (−) poles of the 5 battery when the battery is fully charged. A full charge may refer to a state of charge (SOC) when the charging amount of the battery reaches a configured maximum capacity of 100% without fear of damage or explosion. When the voltage of the battery increases to the target voltage value while charging the battery in the CC mode, the electronic device may perform the charging by gradually reducing the current of the power signal output from the power management circuit from the charging current value so that the voltage of the battery is maintained at the target voltage value. When the current of the power signal output from the power management circuit decreases to a current value for charging completion while charging the battery in a CV mode, the electronic device may determine that the battery is fully charged and may complete charging the battery.

The electronic device may also perform charging by increasing the voltage of the battery by stages. For example, the electronic device may charge the battery by constantly maintaining the current of the power signal output from the power management circuit at a first charging current value. When the voltage of the battery increases to a first target voltage value, the electronic device may gradually reduce the current of the power signal output from the power management circuit from the first charging current value. When the current of the power signal output from the power management circuit decreases to a specified second charging current value, the electronic device may charge the battery by constantly maintaining the current of the power signal output from the power management circuit at the second charging current value. When the voltage of the battery increases to a second target voltage value, the electronic device may gradually reduce the current of the power signal output from the power management circuit from the second charging current value. When the current of the power signal output from the power management circuit decreases to a current value for charging completion, the electronic device may complete charging the battery.

DISCLOSURE

Technical Problem

While a battery is charged, the internal temperature of an electronic device may increase to such an extent that a surface of the electronic device becomes hot enough to burn a user. A thermal control operation for suppressing an increase in the internal temperature may be performed in the electronic device. The thermal control operation may be performed while charging the battery in a CC mode. For example, when the internal temperature of the electronic device increases to a specified first temperature value (e.g., a thermal trigger temperature value) for triggering the thermal control operation, the electronic device may perform a thermal control mode of reducing the current of a power signal output from a power management circuit for a currently configured charging current value to a thermal control current value specified thermal reduction. When the internal temperature of the electronic device decreases to a second temperature value (e.g., a thermal release temperature value) for releasing the thermal control mode while the thermal control mode is performed, the electronic device may release the thermal control mode to increase the current of the power signal output from the power management circuit back to the charging current value.

When the thermal control operation is performed, an increase in the internal temperature is suppressed, but charging time may be relatively long. For example, the charging time may be longer as the number of times the electronic device enters the thermal control mode increases.

Various embodiments may provide an electronic device capable of quickly charging a battery by minimizing the number of times the electronic device enters a thermal control mode.

Technical aspects to be achieved in the disclosure are not limited to the technical aspects mentioned above, and other technical aspects not mentioned will be clearly understood by those skilled in the art from the following description.

Technical Solution

In various embodiments, an electronic device may include a battery, a power management circuit configured to charge the battery using a power signal received from an external power supply device wirelessly or via a cable, a temperature sensor, a processor configured to be connected to the temperature sensor and the power management circuit, and a memory configured to be operatively connected to the processor. The memory may store instructions that, when executed, cause the processor to identify through the temperature sensor that an internal temperature of the electronic device increases to a first temperature value while a current value of the power signal for charging the battery is configured to a first charging current value, configure the current value of the power signal for charging the battery to a thermal control current value, which is lower than the first charging current value, as the internal temperature of the electronic device increases to the first temperature value, identify through the temperature sensor that the internal temperature of the electronic device decreases to a second temperature value while the current value of the power signal for charging the battery is configured to the thermal control current value, and configure the current value of the power signal for charging the battery to a second charging current value, which is lower than the first charging current value but is higher than the thermal control current value, as the internal temperature of the electronic device decreases to the first temperature value.

In various embodiments, an electronic device may include a battery, a power management circuit configured to charge the battery using a power signal received from an external power supply device wirelessly or via a cable, a temperature sensor, a processor configured to be connected to the temperature sensor and the power management circuit, and a memory configured to be operatively connected to the processor. The memory may store instructions that, when executed, cause the processor to perform a thermal control mode of reducing a current value of the power signal for charging the battery from a first charging current value to a thermal control current value according to an internal temperature of the electronic device identified through the temperature sensor being a first temperature value, and release the thermal control mode by increasing the current value of the power signal for charging the battery from the thermal control current value to a second charging current value, which is lower than the first charging current value, according to a decrease in the internal temperature of the electronic device from the first temperature value to a second temperature value, while the battery is charged in a constant current (CC) mode for increasing a voltage of the battery to a target voltage value, and complete charging the battery by blocking a supply of the power signal to the battery when the current value of the power signal for charging the battery decreases to a charging completion current value while the battery is charged in a constant voltage (CV) mode of gradually reducing the current value of the power signal for charging the battery as the voltage of the battery reaches the target voltage value.

In various embodiments, a method for operating an electronic device may include charging a battery of the electronic device using a power signal received from an external power supply device to the electronic device, identifying that an internal temperature of the electronic device increases to a first temperature value while a current value of the power signal for charging the battery is configured to a first charging current value, configuring the current value of the power signal for charging the battery to a thermal control current value, which is lower than the first charging current value, as the internal temperature of the electronic device increases to the first temperature value, identifying that the internal temperature of the electronic device decreases to a second temperature value while the current value of the power signal for charging the battery is configured to the thermal control current value, and configuring the current value of the power signal for charging the battery to a second charging current value, which is lower than the first charging current value but is higher than the thermal control current value, as the internal temperature of the electronic device decreases to the first temperature value.

In various embodiments, a method for operating an electronic device may include performing a thermal control mode of reducing a current value of a power signal for charging a battery of the electronic device from a first charging current value to a thermal control current value according to an internal temperature of the electronic device being a first temperature value, and releasing the thermal control mode by increasing the current value of the power signal for charging the battery from the thermal control current value to a second charging current value, which is lower than the first charging current value, according to a decrease in the internal temperature of the electronic device from the first temperature value to a second temperature value, while charging the battery in a constant current (CC) mode for increasing a voltage of the battery to a target voltage value, and completing charging the battery by blocking a supply of the power signal to the battery when the current value of the power signal for charging the battery decreases to a charging completion current value while charging the battery in a constant voltage (CV) mode of gradually reducing the current value of the power signal for charging the battery as the voltage of the battery reaches the target voltage value.

Advantageous Effects

According to various embodiments, an electronic device may quickly charge a battery by minimizing the number of times the electronic device enters a thermal control mode. In addition, various effects directly or indirectly identified through this document may be provided.

MODE FOR INVENTION

Figure 1:
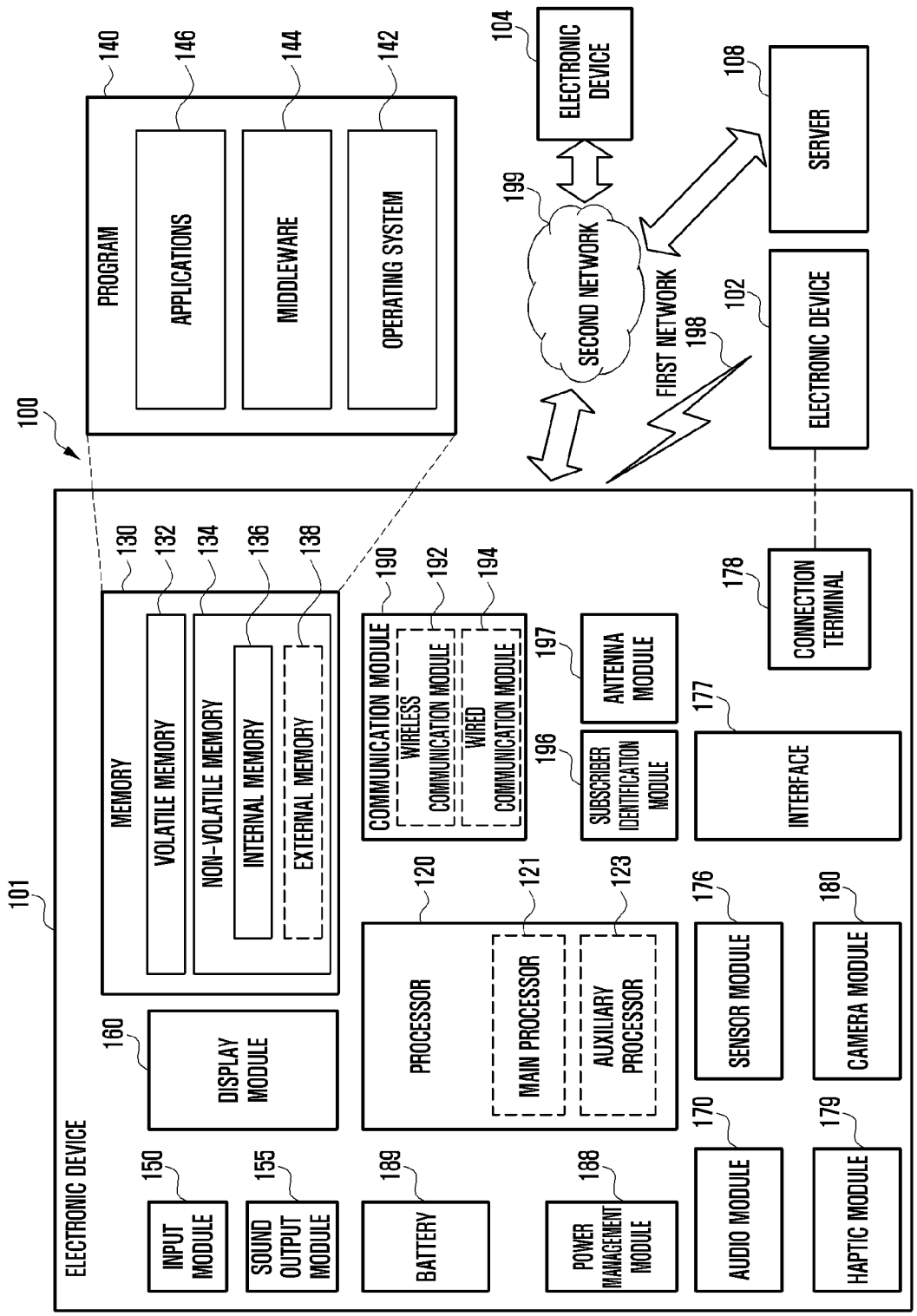
FIG. 1 is a block diagram illustrating an electronic device in a network environment according to various embodiments.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, and/or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), and/or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas.

The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
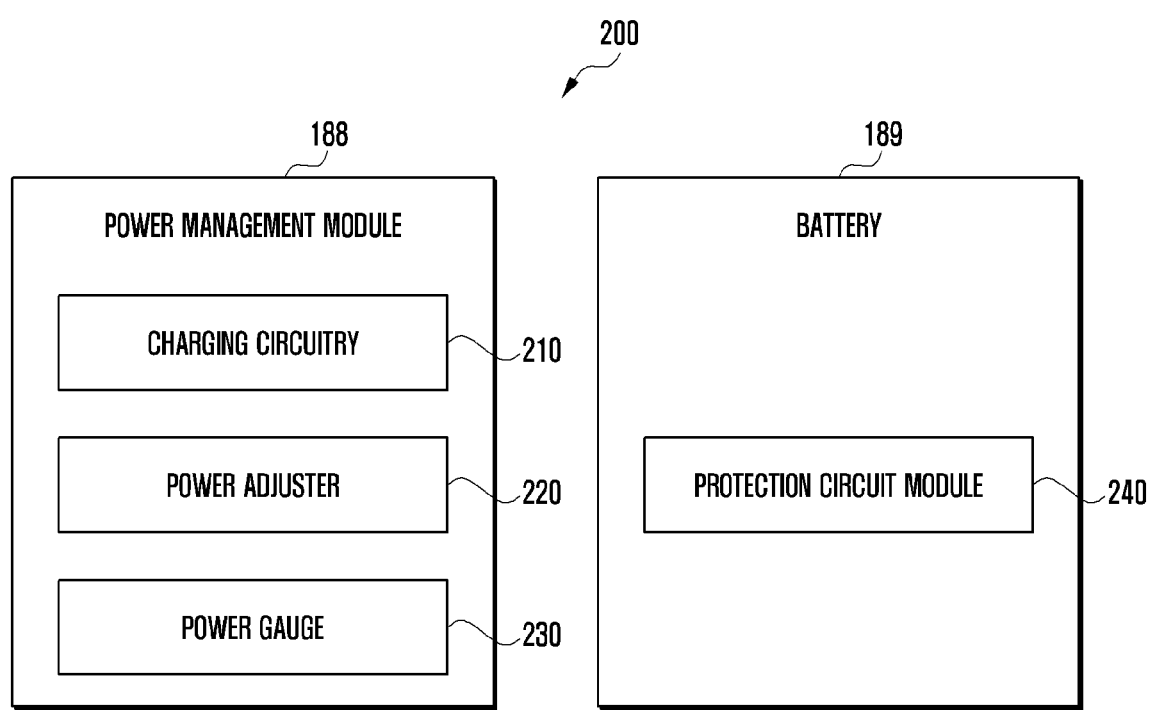
FIG. 2 is a block diagram illustrating a power management module and a battery according to various embodiments.

FIG. 2 is a block diagram 200 illustrating the power management module 188 and the battery 189 according to various embodiments. Referring to FIG. 2, the power management module 188 may include charging circuitry 210, a power adjuster 220, or a power gauge 230. The charging circuitry 210 may charge the battery 189 by using power supplied from an external power source outside the electronic device 101. According to an embodiment, the charging circuitry 210 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. The external power source may be connected with the electronic device 101, for example, directly via the connecting terminal 178 or wirelessly via the antenna module 197.

The power adjuster 220 may generate a plurality of powers having different voltage levels or different current levels by adjusting a voltage level or a current level of the power supplied from the external power source or the battery 189. The power adjuster 220 may adjust the voltage level or the current level of the power supplied from the external power source or the battery 189 into a different voltage level or current level appropriate for each of some of the components included in the electronic device 101. According to an embodiment, the power adjuster 220 may be implemented in the form of a low drop out (LDO) regulator or a switching regulator. The power gauge 230 may measure use state information about the battery 189 (e.g., a capacity, a number of times of charging or discharging, a voltage, or a temperature of the battery 189).

The power management module 188 may determine, using, for example, the charging circuitry 210, the power adjuster 220, or the power gauge 230, charging state information (e.g., lifetime, over voltage, low voltage, over current, over charge, over discharge, overheat, short, or swelling) related to the charging of the battery 189 based at least in part on the measured use state information about the battery 189. The power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). According to an embodiment, at least some of the functions of the power management module 188 may be performed by an external control device (e.g., the processor 120).

The battery 189, according to an embodiment, may include a protection circuit module (PCM) 240. The PCM 240 may perform one or more of various functions (e.g., a pre-cutoff function) to prevent a performance deterioration of, or a damage to, the battery 189. The PCM 240, additionally or alternatively, may be configured as at least part of a battery management system (BMS) capable of performing various functions including cell balancing, measurement of battery capacity, count of a number of charging or discharging, measurement of temperature, or measurement of voltage.

According to an embodiment, at least part of the charging state information or use state information regarding the battery 189 may be measured using a corresponding sensor (e.g., a temperature sensor) of the sensor module 176, the power gauge 230, or the power management module 188. According to an embodiment, the corresponding sensor (e.g., a temperature sensor) of the sensor module 176 may be included as part of the PCM 240, or may be disposed near the battery 189 as a separate device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software 5 (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
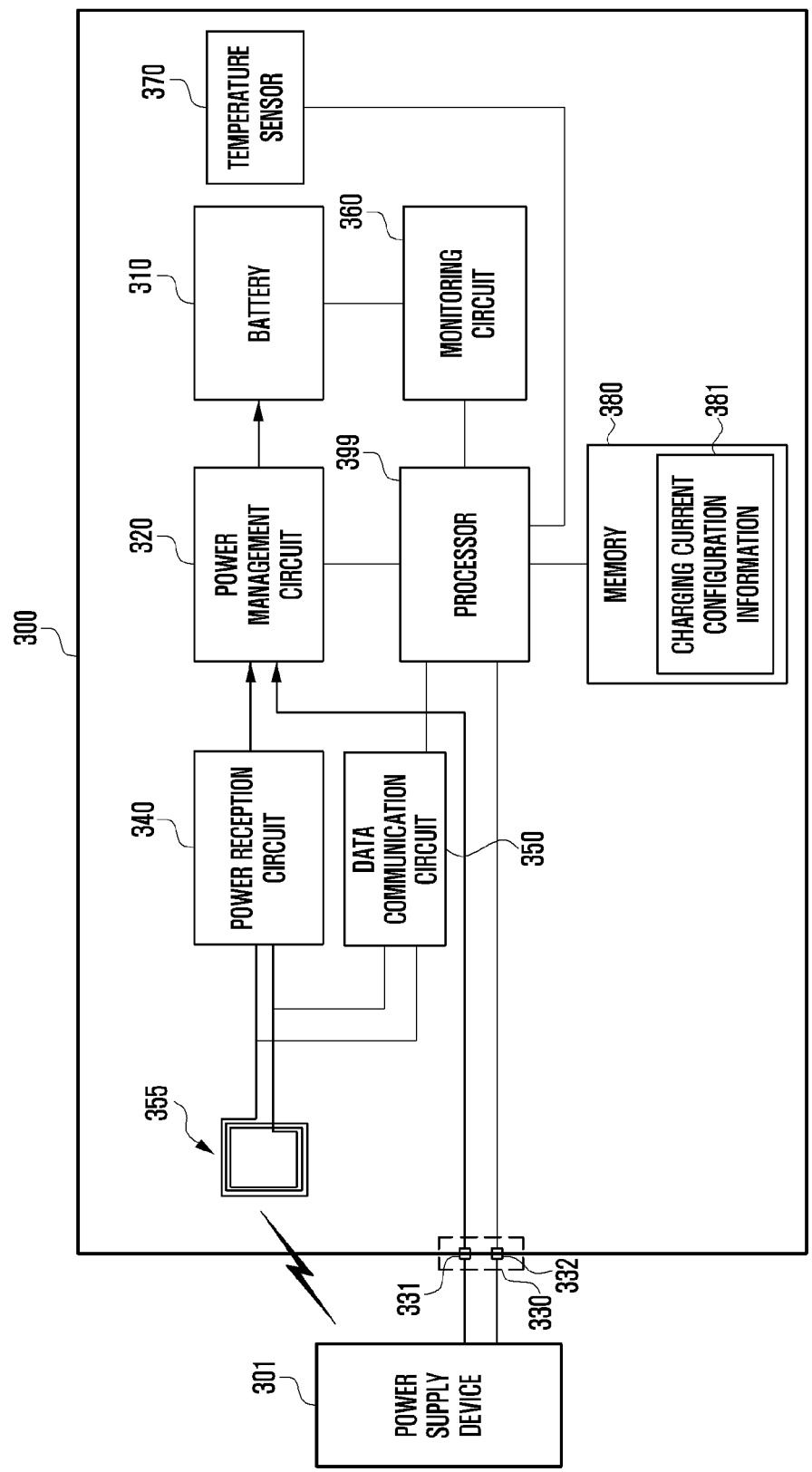
FIG. 3 is a block diagram illustrating an electronic device configured to charge a battery, based on the internal temperature of the electronic device according to various embodiments.

FIG. 3 is a block diagram illustrating an electronic device 300 configured to charge a battery, based on an internal temperature of the electronic device according to various embodiments. Referring to FIG. 3, the electronic device 300 (e.g., the electronic device 101 of FIG. 1) may include a battery 310, a power management circuit 320, a connection terminal 330, a coil 335, a power reception circuit 340, a data communication circuit 350, a monitoring circuit 360, a temperature sensor 370, a memory 380, and a processor 399.

A power supply device 301 (e.g., the electronic device 102 of FIG. 1) may include an adaptor. For example, the adapter may convert a current characteristic of a power signal input from an external power source from an alternating current (AC) to a direct current (DC) and may adjust the voltage of the power signal to a specified voltage value. The adapter may perform a function of changing a current and voltage (e.g., a programmable power supply (PPS)) according to control of the electronic device 300 to receive the power signal. For example, the adapter may reduce or increase a current of the power signal to be output to the electronic device 300 in response to a control signal received from the electronic device 300. The adapter may also reduce or increase the voltage of the power signal to be output to the electronic device 300 in response to a control signal received from the electronic device 300 through a cable. The adapter may be a model that fixes the current and/or voltage of the power signal to a specified value and outputs the current and/or voltage without supporting the variable function. When the adapter is a model supporting the variable function, the adapter of the power supply device 301 may change the voltage (or current) of the power signal to be output to the electronic device 300 to a voltage value (or current value) configured to charge the battery 310. When the adapter is the model that does not support the variable function, the power management circuit 320 (e.g., the power management module 188 of FIG. 1 and FIG. 2) may adjust the voltage (or current) of the power signal received from the power supply device 301 to a voltage value (or voltage value) configured to charge the battery 310.

The power supply device 301 may be electrically connected to the connection terminal 330 of the electronic device 300 through a cable (e.g., a USB cable). The power supply device 301 may output the power signal of which the voltage is adjusted and the current characteristic is converted into DC by the adapter through the cable and to a power terminal 331 of the connection terminal 330. The power management circuit 320 may charge the battery 310 using the power signal received from the power supply device 301 through the power terminal 331.

The power supply device 301 may include a component for wirelessly transmitting the power signal of which the voltage is adjusted and the current characteristic is converted into the DC by the adapter. For example, the power supply device 301 may include a power transmission circuit and a coil. The power transmission circuit (e.g., a full-bridge circuit) may convert the current characteristic of the power signal output from the adapter of the power supply device 301 from a DC to an AC and may transmit supply the power signal, of which the current characteristic is converted to the AC, to the electronic device 300 through the coil of the power supply device 301.

The coil 335 of the electronic device 300 may receive the power signal from the power supply device 301 through an electrical coupling with the coil of the power supply device 301. The power reception circuit 340 (e.g., a rectifier circuit) may convert the current characteristic of the power signal received from the power supply device 301 through the coil 335 from an AC to a DC and may output the power signal of which the current characteristic is converted into the DC to the power management circuit 330. The power management circuit 320 may charge the battery 310 using the power signal received from the power supply device 301 through the power reception circuit 340.

The power management circuit 320 may support CC and CV charging, based on control of the processor 399. For example, during a charging mode of a CC mode, the power management circuit 330 may constantly maintain the current of the power signal output from the power management circuit 320 to the battery 310 at a charging current value configured by the processor 399 so that the voltage of the battery 310 increases to a specified target voltage. When the voltage of the battery 310 reaches the target voltage value and thus the charging mode is changed from the CC mode to a CV mode, the power management circuit 320 may gradually reduce the current of the power signal output from the power management circuit 320 under control of the processor 399, thereby maintaining the voltage of the battery 310 at the target voltage value. When the current of the power signal input to the battery 310 decreases to a specified charging completion current value (e.g., a top-off current value) while charging the battery 310 in the CV mode, the power management circuit 320 may complete charging of the battery 310 by stopping an output of the power signal to the battery 310, based on control of the processor 399.

The power management circuit 320 may support a thermal control operation of the processor 399 being performed while the battery 310 is charged in the CC mode. For example, the power management circuit 320 may reduce the current of the power signal to be output from the power control circuit 320 to the battery 310 from a first charging current value to a first thermal control current value configured by the processor 399 according to a command to perform a thermal control mode from the processor 399. The power management circuit 320 may increase the current of the power signal output from the power control circuit 320 from the thermal control current value to a second charging current value according to a command to release the thermal control mode from the processor 399. The second charging current value may be lower than the first charging current value. The power management circuit 320 may adjust the current of the power signal output from the power management circuit 320 according to a command of the processor 399 while the battery 310 is charged in the CC mode. For example, after the current of the power signal output from the power management circuit 320 is configured to the second charging current value, the power management circuit 320 may reconfigure the charging current value to the first charging current value according to a command of the processor 399.

The power supply device 301 may alternatively support CC and CV charging, based on control of the processor 399, instead of the power management circuit 320. For example, the processor 399 may determine whether the power supply device 301 is a device capable of autonomously adjusting the current and voltage of a power signal through data communication with the power supply device 301. The data communication between the processor 399 and the power supply device 301 may be performed by wire through a data terminal 332 of the connection terminal 330 or wirelessly through the coil 335. For wireless communication through the coil 335, the data communication circuit 350 may be provided in the electronic device 300. The data communication circuit 350 may obtain data transmitted by the power supply device 301 from a change in the amplitude of the power signal received from the power supply device 301 through the coil 335 and may output the obtained data to the processor 399. The data communication circuit 350 may modulate the amplitude of the power signal received from the power supply device 301 through the coil 335, based on data received from the processor 399, thereby transmitting the data received from the processor 399 to the power supply device 301 through the coil 335. The processor 399 may perform data communication with the power supply device 301 wirelessly through a short-range wireless communication circuit (e.g., a Bluetooth, Bluetooth Low Energy (BLE), Wi-Fi, and/or near-field communication (NFC) communication circuit) instead of the data communication circuit 350. The processor 399 may identify the power supply device 301 as a device capable of supporting CC and CV charging from data (e.g., identification information indicating that the power supply 301 is a model having a PPS function) received from the power supply device 301. Accordingly, the processor 399 may control the power supply device 301 through data communication with the power supply device 301 so that the power supply device 301 supports CC and CV charging. In CC and CV charging using the power supply device 301, the processor 399 may control the power management circuit 320 to output the received power signal to the battery 310 without adjusting the current and voltage.

The power supply device 301 may support the thermal control operation instead of the power management circuit 320, based on control of the processor 399. For example, the power supply device 301 may receive a command to perform the thermal control mode from the processor 399 through data communication, and accordingly may reduce the current of the power signal to be transmitted to the electronic device 300 from a third charging current value to a second thermal control current value configured by the processor 399. Considering power loss incurred when the power signal is transmitted from the power supply device 301 to the battery 310, the third charging current value may be configured to be higher than the first charging current value, and the second thermal control current value may also be configured to be higher than the first thermal control current value. The power supply device 301 may receive a command of the processor 399 to release the thermal control mode from the processor 399 through data communication, and accordingly may increase the current of the power signal to be transmitted to the electronic device 300 from the second thermal control current value to a fourth charging current value. The fourth charging current value may be lower than the third charging current value. The power supply device 301 may adjust the current of the power signal to be output from the power supply device 301 to the battery 310 according to a command of the processor 399 while the battery 310 is charged in the CC mode. For example, after the current value of the power signal transmitted to the electronic device 300 is configured to the fourth charging current value, the power management circuit 320 may reconfigure the current value to the third charging current value according to a command of the processor 399.

The monitoring circuit 360 (e.g., the power gauge 230 of FIG. 2) may monitor the voltage of the battery 310. For example, the monitoring circuit 360 may be connected to both poles (+pole and −pole) of the battery 310 to monitor the voltage of the battery 310, and may output a monitoring result (data indicating a voltage value) to the processor 399. The processor 399 may charge the battery 310 in the CC or CV mode, based on the monitoring result. For example, as a result of monitoring, when the voltage of the battery 310 is lower than a target voltage value, the processor 399 may control the power management circuit 320 or the power supply device 301 so that the battery 310 is charged in the CC mode. As a result of monitoring, when the voltage of the battery 310 reaches the target voltage value, the processor 399 may control the power management circuit 320 or the power supply device 301 so that the battery 310 is charged in the CV mode.

The temperature sensor 370 (e.g., the sensor module 176 of FIG. 1 or the power gauge 230 of FIG. 2) may be disposed inside the electronic device 300. For example, the temperature sensor 370 may be disposed inside or around the battery 310 to measure temperature, and may output data indicating the measured temperature to the processor 399. The processor 399 may perform a function for thermal control of the battery 310, based on temperature data identified through the temperature sensor 370. Instructions for thermal control may be stored in the memory 380 (e.g., the memory 130 of FIG. 1), and may be executed by the processor 399 (e.g., the processor 120 of FIG. 1).

Figure 4:
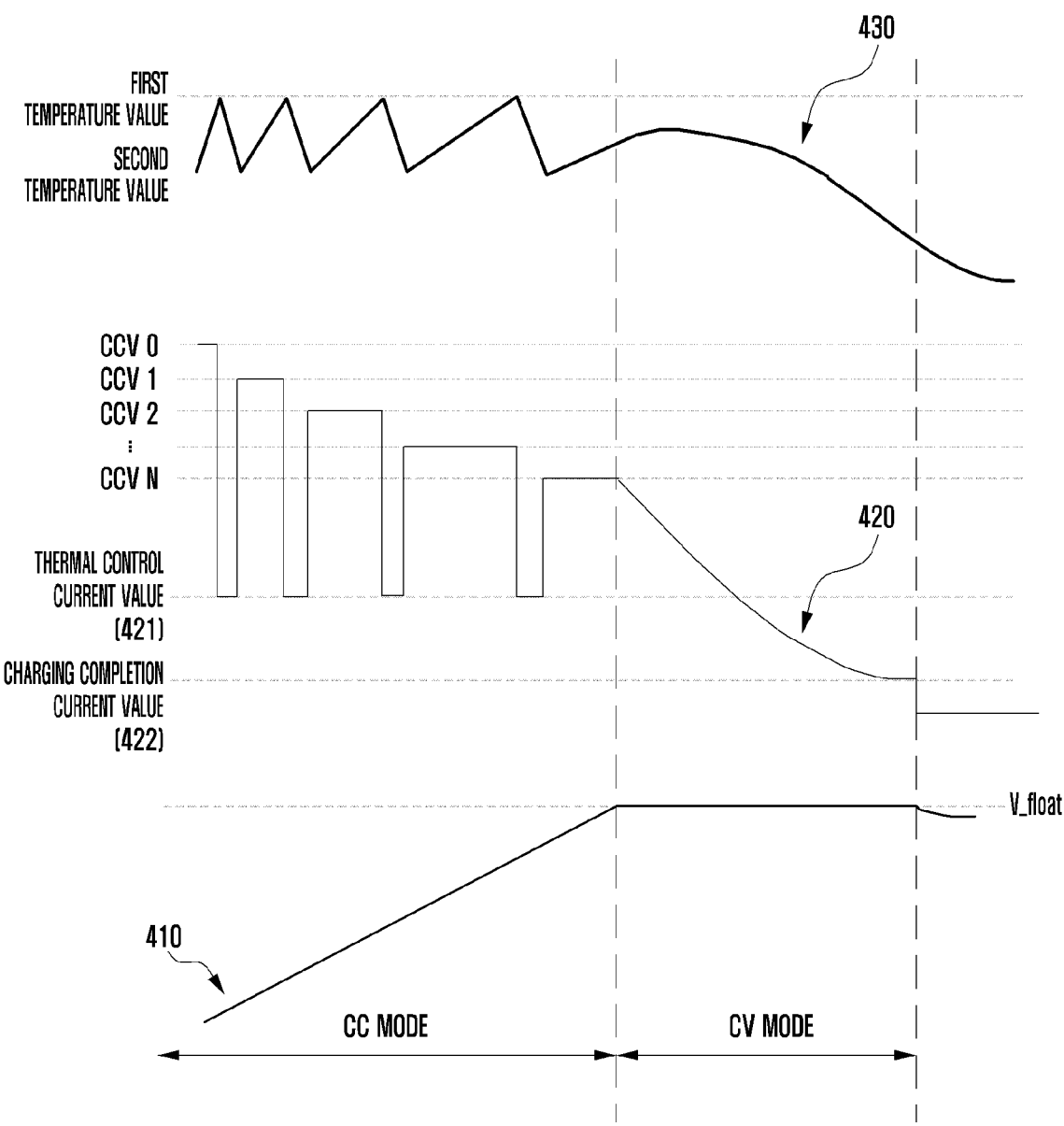
FIG. 4 illustrates a thermal control operation performed by a processor, based on temperature data according to an embodiment.

FIG. 4 illustrates a thermal control operation performed by the processor 399, based on temperature data, according to an embodiment. In FIG. 4, a first waveform 410 denotes a change in voltage of the battery 310 while the battery 310 is being charged. A second waveform 420 denotes a change in current of a power signal output to the battery 310 while the battery 310 is being charged. A third waveform 430 denotes a change in internal temperature of the electronic device 300 while the battery 310 is being charged.

The processor 399 may store charging current configuration information 381 (see FIG. 3) to be used to configure the current of the power signal output from the power management circuit 320 (or the power supply device 301) to the battery 310 while the battery 310 is being charged in the CC mode, including Table 1 illustrated below, in the memory 380. In Table 1, charging current value (CCV) n (=1, N) may be configured to be smaller than CCV n−1.

TABLE 1

| # (Number) | Number of thermal control modes | Charging current value |
|---|---|---|
| 0 | 0 | CCV 0 (Max) |
| 1 | 1 | CCV 1 |
| 2 | 2 | CCV 2 |
| ... | ... | ... |
| N | N or greater | CCV N (Min) |
| | Thermal control current value < CCV N | |

The processor 399 may recognize that the power supply device 301 is connected to the electronic device 300 through the coil 335 or the connection terminal 330, and may start charging the battery 310 accordingly. For example, the processor 399 may receive a message (e.g., a ping signal) for requesting information about the electronic device 300 through the coil 335. The processor 399 may control the data communication circuit 350 to transmit a response message, for example, identification information about the electronic device 300 (e.g., version information, a manufacture code, and/or a basic device identifier) and/or configuration information associated with wireless charging (e.g.: a wireless charging frequency, maximum charging power, a required charging power, and/or an average transmitted power), to the power supply device 301 through the coil 335. After the response message is transmitted, a power signal may be received by the electronic device 300 through the coil 350, and the processor 399 may control the power management circuit 320 to charge the battery 310. In another example, the processor 399 may recognize that the power supply device 301 is connected to the electronic device 300 through the data terminal 332, and may start charging the battery 310 accordingly.

The processor 399 may identify the voltage of the battery 310 through the monitoring circuit 360 in a first operation for charging the battery 310. As a result of such identification, the processor 399 may recognize that the voltage of the battery 310 has not yet reached V_float, and may determine a charging mode as the CC mode accordingly. As the charging mode is determined as being the CC mode, the processor 399 may reconfigure the number of thermal control modes to 0 and may identify a charging current value corresponding to the reconfigured number of thermal control modes in the charging current configuration information 381 (e.g., Table 1). The processor 399 may configure the current of the power signal output to the battery 310 to a maximum charging current value of CCV 0 according to the result of the identification.

As a temperature around the electronic device 300 increases, the internal temperature of the electronic device 300 may rise correspondingly. The processor 399 may configure a charging current value after the thermal control mode is released to be lower than a charging current value configured before the thermal control mode is performed, thereby suppressing a rise in temperature. For example, the processor 399 may periodically monitor the internal temperature of the electronic device 300 through the temperature sensor 370 after configuring the charging current to CCV 0. When the internal temperature of the electronic device 300 increases to a first temperature value, the processor 399 may perform the thermal control mode for reducing the temperature by reducing the charging current to a thermal control current value 421. Further, the processor 399 may increase the number of thermal control modes by one. The processor 399 may recognize through the temperature sensor 370 that the temperature decreases to a second temperature value through thermal control. Accordingly, the processor 399 may identify a charging current value of CCV 1 corresponding to the number of thermal control modes "1" in Table 1. The processor 399 may release the thermal control mode by increasing the charging current to the identified value of CCV 1. Subsequently, the thermal control mode may be repeated a plurality of times while the battery 310 is charged in the CC mode. The charging current value starts from CCV0, and may be reduced by stages in an order of CCV1, CCV 2, . . . , CCV N as shown in FIG. 4 whenever the thermal control mode is released.

The processor 399 may recognize that the voltage of the battery 310 reaches V_float through the monitoring circuit 360. Accordingly, the processor 399 may change the charging mode to a CV mode to gradually reduce the current of the power signal output to the battery 310 so that the voltage of the battery 310 is maintained at V_float. When the current of the power signal output to the battery 310 is reduced to a charging completion current value 422, the processor 399 may complete charging the battery 310 by stopping output of the power signal to the battery 310.

Although FIG. 4 shows that the thermal control current value 421 may be fixed, the thermal control current value 421 may also be variable. For example, the thermal control current value 421 may be configured to a first value before the voltage of the battery 310 reaches a specified charging voltage value (<V_float) during charging of the battery 310 in the CC mode, and the thermal control current value 421 may be configured to a second value (>first value) after the voltage of the 5 battery 310 reaches the charging voltage value.

Figure 5:
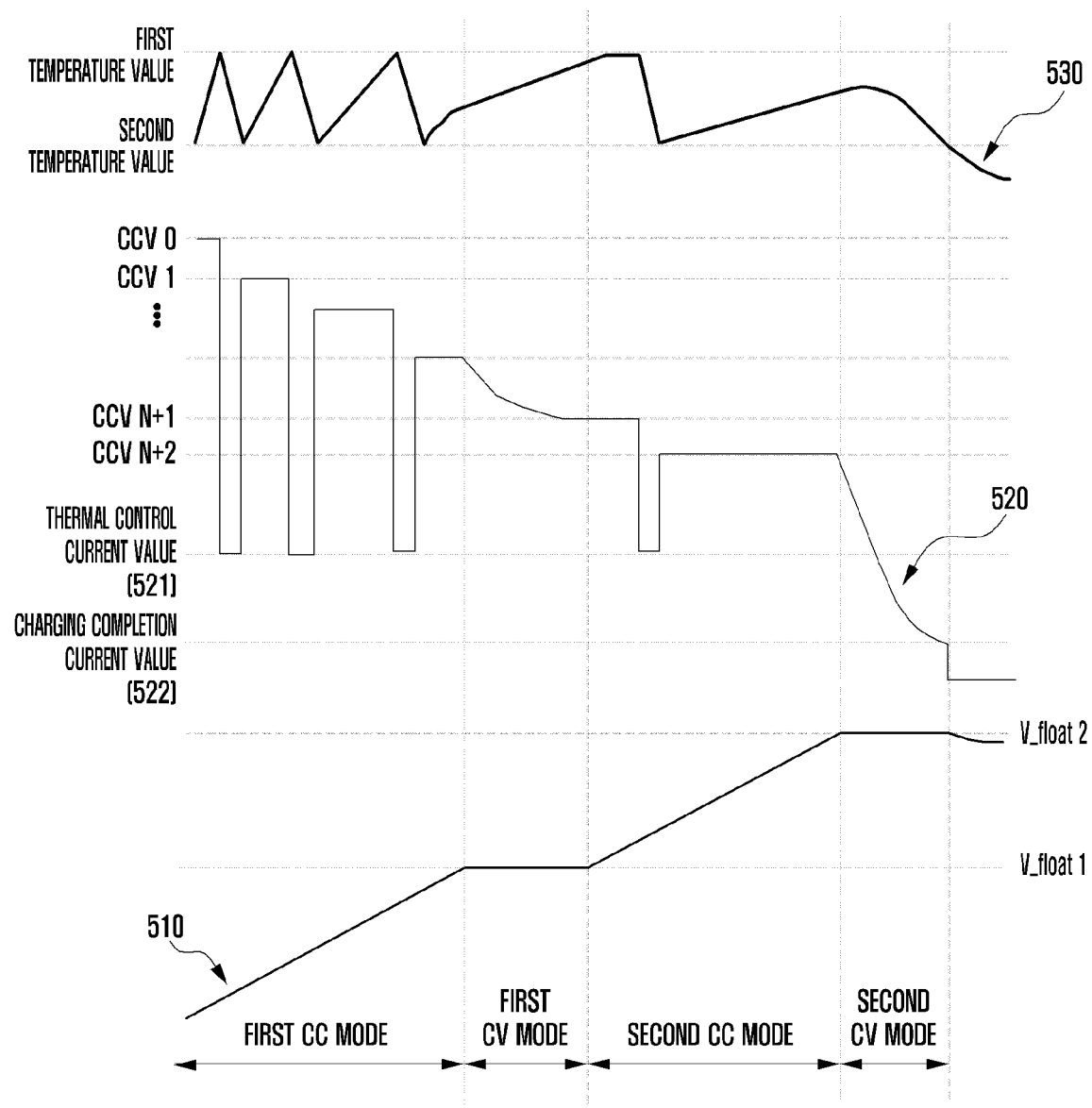
FIG. 5 illustrates a thermal control operation performed by a processor, based on temperature data according to an embodiment.

FIG. 5 illustrates a thermal control operation performed by the processor 399, based on temperature data, according to an embodiment. In FIG. 5, a first waveform 510 denotes a change in voltage of the battery 310 while the battery 310 is being charged. A second waveform 520 denotes a change in current of a power signal output to the battery 310 while the battery 310 is being charged. A third waveform 530 denotes a change in internal temperature of the electronic device 300 while the battery 310 is being charged.

The processor 399 may charge the battery 310 by increasing the voltage of the battery 310 in stages. For example, the processor 399 may increase the voltage of the battery 31 to V_float 1 by charging the battery 310 in a first CC mode and may then increase the voltage of the battery 310 to V_float 2 (full charge voltage) by charging the battery 310 in a second CC mode.

The processor 399 may store charging current configuration information 381 used to configure the current of the power signal output from the power management circuit 320 (or the power supply device 301) to the battery 310 while the battery 310 is being charged in the first CC mode or the second CC mode, including Table 2 illustrated below, in the memory 380. In Table 2, CCV nm (=1, 2, . . . , N, N+1, N+2, N+M) may be configured to be smaller than CCV nm−1.

TABLE 2

| # (Number) | Number of thermal control modes | Charging current value | Charging current configuration range |
|---|---|---|---|
| 0 | 0 | CCV 0 (maximum value in first CC mode) | First range (first CC mode) |
| 1 | 1 | CCV 1 | |
| ... | ... | ... | |
| N | N | CCV N | |
| N + 1 | N + 1 | CCV N + 1 (maximum value in second CC mode) | Second range (first CC mode and second CC mode) |
| N + 2 | N + 2 | CCV N + 2 | |
| ... | ... | ... | |
| N + M | N + M or greater | CCV N + M (minimum value) | |
| Thermal control current value < CCV N + M | | | |

While charging the battery 310 in the first CC mode, the processor 399 may recognize that the internal temperature of the electronic device 300 increases to a first temperature value through the temperature sensor 370, and may perform the thermal control mode accordingly. The processor 399 may recognize that the internal temperature of the electronic device 300 decreases to a second temperature value through the temperature sensor 370, and may release the thermal control mode accordingly. The processor 399 may configure a charging current value after the thermal control mode is released to be lower than a charging current value configured before the thermal control mode is performed, thereby suppressing a rise in temperature. For example, the processor 399 may configure the charging current to a maximum value of CCV 0 in the first CC mode and may then periodically monitor the internal temperature of the electronic device 300 through the temperature sensor 370. When the temperature increases to the first temperature value, the processor 399 may perform the thermal control mode for reducing the temperature by reducing the charging current to a thermal control current value 521. When the temperature decreases to the second temperature value, the processor 399 may release the thermal control mode by increasing the charging current to CCV 1 which is lower than CCV 0 and may continue charging the battery 310. Subsequently, the thermal control mode may be further performed one or more times while the battery 310 is being charged in the first CC mode. Referring to Table 2, whenever the thermal control mode is released, the charging current value may be reduced by stages in a first range and in a second range according to the number of thermal control modes.

The processor 399 may recognize that the voltage of the battery 310 reaches V_float 1 through the monitoring circuit 360. Accordingly, the processor 399 may change the charging mode to a first CV mode to gradually reduce the current of the power signal output to the battery 310 so that the voltage of the battery 310 is maintained at V_float 1. When the current of the power signal output to the battery 310 is reduced to a current value for completing the first CV mode, the processor 399 may start charging the battery 310 in the second CC mode. As shown, the current value for completing the first CC mode may be configured to be CCV N+1, which is a maximum charging current value in the second CC mode. When the current value for completing the first CC mode is configured to be lower than CCV N+1, the processor 399 may maintain the present current reduced to the current value for completing the first CC mode as a current value of the power signal for charging the battery 310.

While charging the battery 310 in the second CC mode, the processor 399 may recognize that the internal temperature of the electronic device 300 increases to the first temperature value through the temperature sensor 370, and may perform the thermal control mode accordingly. The processor 399 may recognize that the internal temperature of the electronic device 300 decreases to a second temperature value through the temperature sensor 370, and may release the thermal control mode accordingly. The processor 399 may configure a charging current value after the thermal control mode is released to be lower than a charging current value configured before the thermal control mode is performed, thereby suppressing a rise in temperature. For example, when the temperature increases to the first temperature value, the processor 399 may perform the thermal control mode for reducing the temperature of the battery 310 by reducing the charging current from CCV N+1 to the thermal control current value 521. When the temperature decreases to the second temperature value, the processor 399 may release the thermal control mode by increasing the charging current to CCV N+2 which is lower than CCV N+1 and may continue charging the battery 310 in the second CC mode. Subsequently, the thermal control mode may be further performed one or more times while the battery 310 is being charged in the second CC mode. Referring to Table 2, whenever the thermal control mode is released, the charging current value may be reduced by stages in the second range according to the number of thermal control modes.

The processor 399 may recognize that the voltage of the battery 310 reaches V_float 2 through the monitoring circuit 360. Accordingly, the processor 399 may change the charging mode to a second CV mode to gradually reduce the current of the power signal output to the battery 310 so that the voltage of the battery 310 is maintained at V_float 2. When the current of the power signal output to the battery 310 is reduced to a charging completion current value 522, the processor 399 may complete charging the battery 310 by stopping an output of the power signal to the battery 310.

Figure 6:
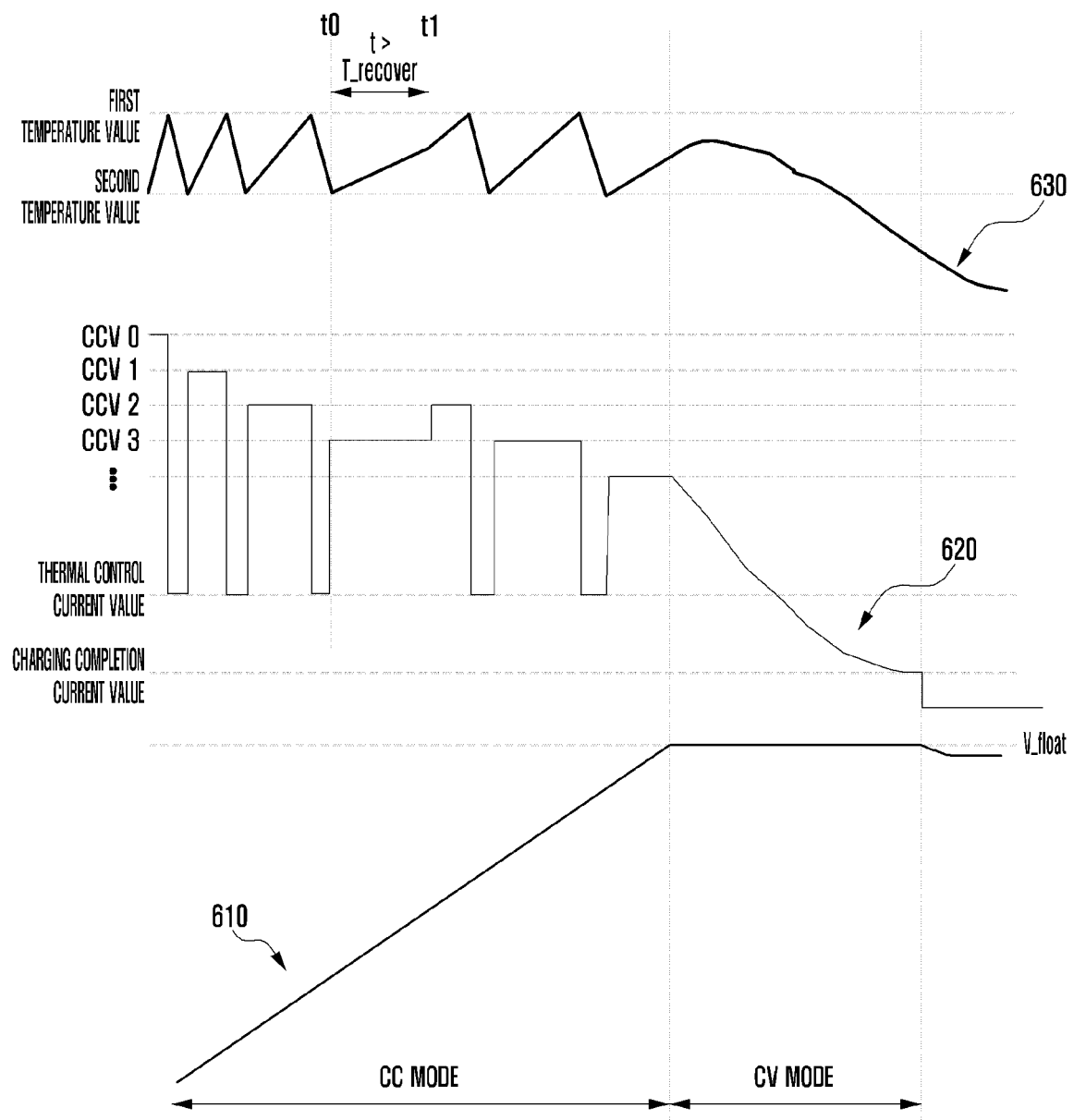
FIG. 6 illustrates a thermal control operation performed by a processor, based on temperature data according to an embodiment.

FIG. 6 illustrates a thermal control operation performed by the processor 399, based on temperature data, according to an embodiment. In FIG. 6, a first waveform 610 denotes a change in voltage of the battery 310 while the battery 310 is being charged. A second waveform 620 denotes a change in current of a power signal output to the battery 310 while the battery 310 is being charged. A third waveform 630 denotes a change in internal temperature of the electronic device 300 while the battery 310 is being charged. In describing FIG. 6, details overlapping with those of FIG. 4 will be omitted or briefly described.

The processor 399 may configure a charging current value using, for example, using Table 1, as charging current configuration information 381 while the battery 310 is being charged in a CC mode. When a thermal control mode is released as the internal temperature of the electronic device 300 is reduced to a second temperature value, the processor 399 may count time from a release time point. When the internal temperature of the electronic device 300 does not increase to a first temperature value even after a lapse of a specified reference time period, the processor 399 may increase the charging current value. For example, while the battery 310 is being charged in the CC mode, the thermal control mode may be repeated a plurality of times, so that the charging current value may be gradually reduced in an order of CCV 0, CCV 1, CCV 2, and CCV 3. The processor 399 may count a time period of t from a time point of t0 when the thermal control mode is released and thus the charging current value increases from a thermal control current value to CCV 3. When the internal temperature of the electronic device 300 does not increase to the first temperature value at a time point of t1 when t exceeds a specified value of T_recover, the processor 399 may recover the charging current value by one stage from CCV 3 to CCV 2. In addition, the number of thermal control modes may be reduced by one from 3 to 2.

Figure 7:
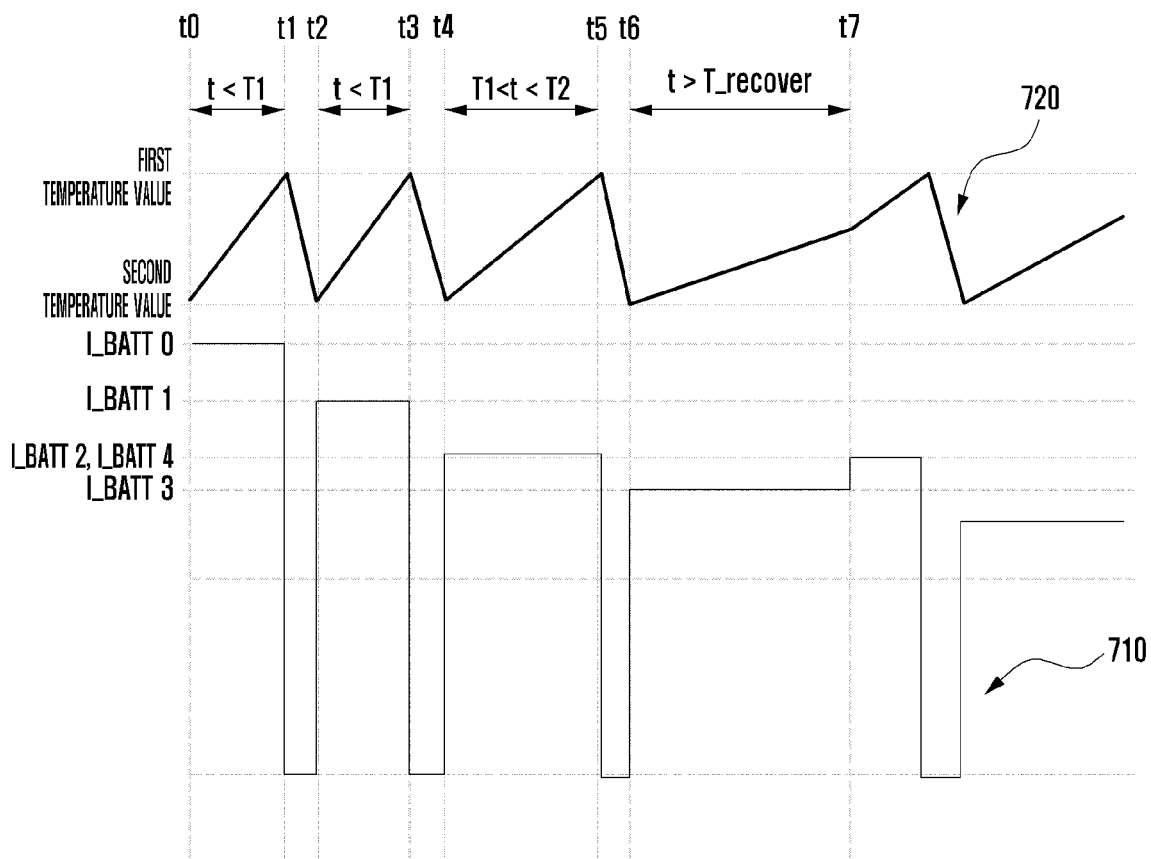
FIG. 7 illustrates a thermal control operation performed by a processor, based on temperature data according to an embodiment.

FIG. 7 illustrates a thermal control operation performed by the processor 399, based on temperature data, according to an embodiment. In FIG. 7, a first waveform 710 denotes a change in current of a power signal output to the battery 310 while the battery 310 is being charged. A second waveform 720 denotes a change in internal temperature of the electronic device 300 while the battery 310 is being charged. In describing FIG. 7, details overlapping with those of FIG. 4 will be omitted or briefly described.

The processor 399 may store charging current configuration information 381 used to configure the current of the power signal output from the power management circuit 320 (or the power supply device 301) to the battery 310 while the battery 310 is being charged in the CC mode, including Table 3 illustrated below, in the memory 380. In Table 3, n denotes the number of times the thermal control mode is performed. C is a unit representing a current and may be, for example, mA. A charging current value of I_BATT 0 initially configured in the CC mode may be configured to, for example, CCV 0 in Table 1. I_BATT 0 may be a maximum value configured as a charging current value.

TABLE 3

| Non-thermal control mode time period | Charging current value (I_BATT n) |
| --- | --- |
| t < T1 | I_BATT n-1 − 0.1C |
| T1 < t < T2 | I_BATT n-1 − 0.05C |
| t > T_recover | I_BATT n-1 + 0.05C |

When a thermal control mode is released by a temperature decrease from a first temperature value to a second temperature value, the processor 399 may configure a charging current value, based on a time period in which the battery 310 is charged in the CC mode (e.g., a non-thermal control mode time period in Table 3) before the thermal control mode is released. For example, when charging is started in the CC mode, the processor 399 may configure the charging current value to the maximum value of I_BATT 0 (e.g., CCV 0 in Table 1). Subsequently, a first thermal control mode may be performed due to an increase in internal temperature of the electronic device 300 (reaching the first temperature value). The first thermal control mode may be released due to a decrease in the temperature (reaching the second temperature value). As the first thermal control mode is released, the processor 399 may configure the number n of thermal control modes from 0 to 1. The processor 399 may configure a charging current of I_BATT 1 to I_BATT 0-0.1C as a non-thermal control mode time period of t is less than T1 from t0 to t1 before the first thermal control mode is released.

As the temperature increases to the first temperature value during charging with I_BATT 1, a second thermal control mode may be performed. Subsequently, as the temperature decreases to the second temperature value, the second thermal control mode may be released. Accordingly, the processor 399 may configure the number n of thermal control modes from 1 to 2, and may configure a charging current of I_BATT 2 to I_BATT 1-0.1C as a non-thermal control mode time period of t(t3−t2) is less than T1.

As the temperature increases to the first temperature value during charging with I_BATT 2, a third thermal control mode may be performed. Subsequently, as the temperature decreases to the second temperature value, the third thermal control mode may be released. Accordingly, the processor 399 may configure the number n of thermal control modes from 2 to 3, and may configure a charging current of I_BATT 3 to I_BATT 1-0.05C as a non-thermal control mode time period of t(t5−t4) is greater than T1 and is less than T2.

As the temperature increases to the first temperature value during charging with I_BATT 3, a fourth thermal control mode may be performed. Subsequently, as the temperature decreases to the second temperature value, the fourth thermal control mode may be released. Accordingly, the processor 399 may configure the number n of thermal control modes from 3 to 4, and may configure a charging current of I_BATT 4 to I_BATT 3+0.05C as a non-thermal control mode time period of t(t7−t6) is greater than T_recover.

According to the following Joule's law (Equation 1), Joule's heat (H) is proportional to the square of a current. Thus, when the charging current is reduced, the amount of heat generated in a charging line may be reduced by the square of the current. Accordingly, the thermal control operation performed by the processor 399 may suppress an increase in the internal temperature of the electronic device 300 and may reduce the frequency of entering the thermal control mode during charging, thereby reducing charging time.

$$H = I^2 Rt [J] \quad \text{[Equation 1]}$$

Figure 8:
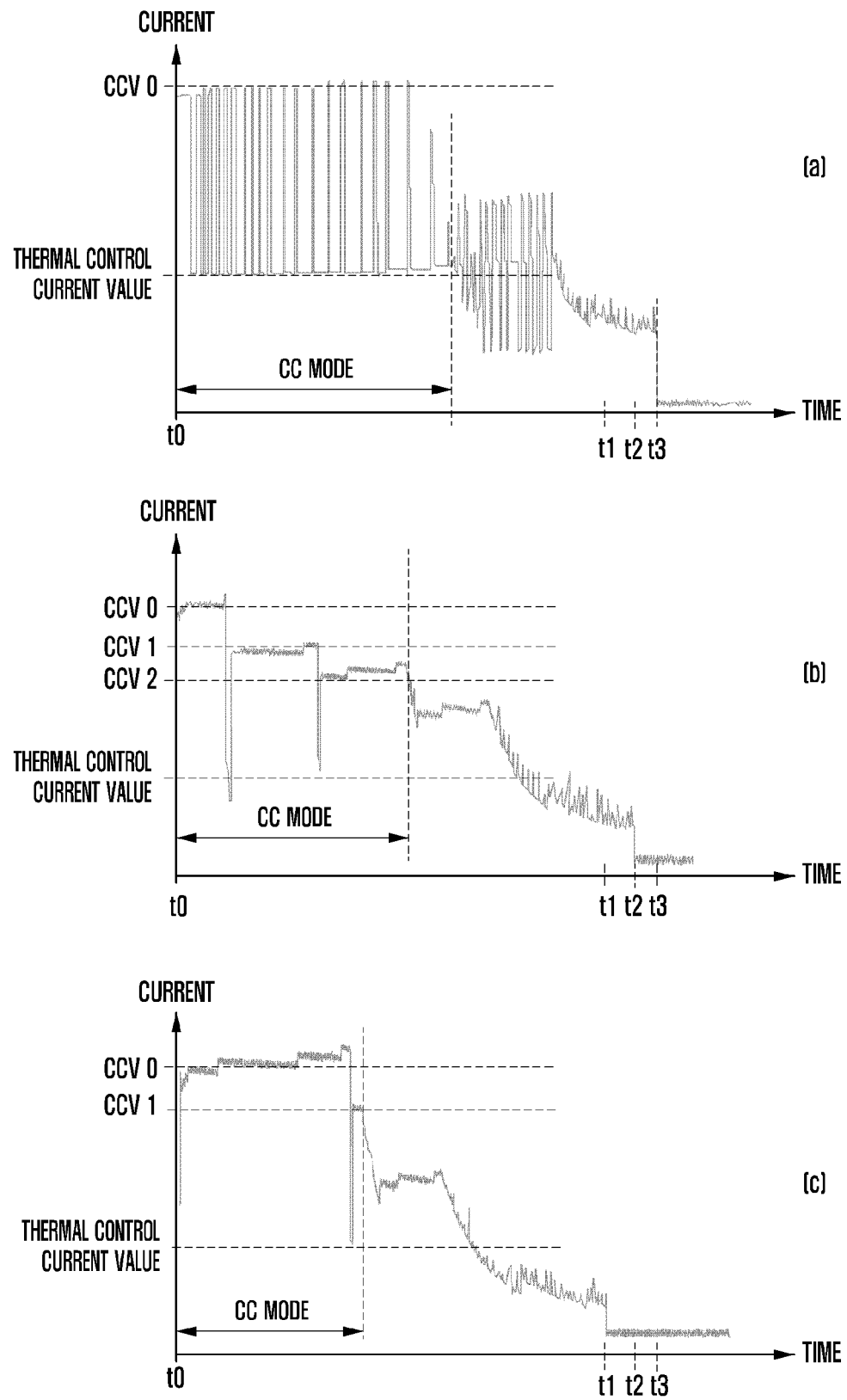
FIG. 8 is a diagram for comparing a case where a thermal control operation is performed by a processor and a case where no thermal control operation is performed.

FIG. 8 is a diagram for comparing a case where a thermal control operation is performed by the processor 399 and a case where no thermal control operation is performed. FIG. 8(a) shows the waveform of a charging current when the thermal control operation is not performed. FIG. 8(b) shows the waveform of a charging current when the thermal control operation is performed under the same condition as in FIG. 8(a). FIG. 8(c) shows the waveform of a charging current when the thermal control operation is performed in a low temperature state compared to FIG. 8(b).

Referring to FIG. 8(a), charging is started at a time point of t0 and the charging current is configured to CCV0. While charging a battery in a CC mode, the charging current is frequently adjusted from CCV0 to a thermal control current value. Subsequently, charging is performed in a CV mode, and is completed at a time point of t3. Referring to FIG. 8(b), the charging current is gradually reduced in an order of CCV0, CCV1, and CCV2 due to the thermal control operation. Charging is completed at a time point of t2, which is earlier than t3. Referring to FIG. 8(c), the charging current is reduced by one stage from CCV0 to CCV 1 by the thermal control operation, and charging is completed at a time point of t1, which is earlier than t2.

Figure 9:
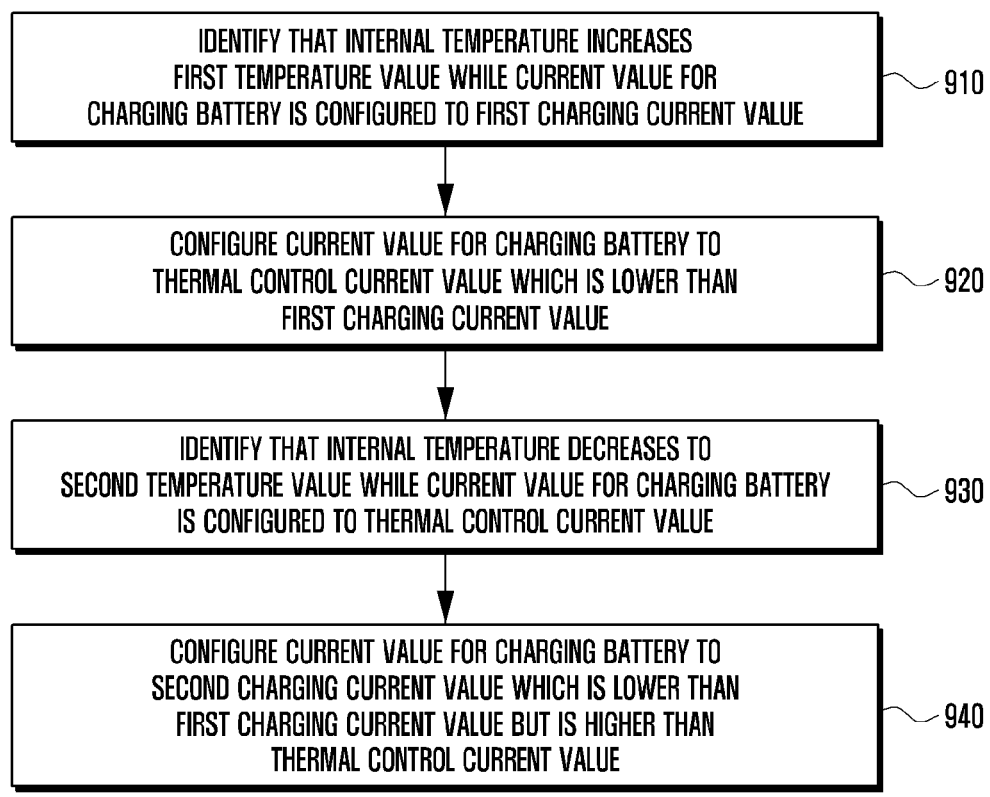
FIG. 9 illustrates operations of a processor for thermal control during charging of a battery in the CC mode according to an embodiment.

FIG. 9 illustrates operations of the processor 399 for thermal control during charging of the battery 310 in the CC mode according to an embodiment.

In operation 910, the processor 399 may identify through the temperature sensor 370 that the internal temperature of the electronic device 300 increases a first temperature value while the current value of a power signal for charging the battery 310 is configured to a first charging current value.

In operation 920, the processor 399 may configure the current value of the power signal for charging the battery 310 to a thermal control current value which is lower than the first charging current value as the internal temperature increases to the first temperature value.

In operation 930, the processor 399 may identify through the temperature sensor 370 that the internal temperature decreases to a second temperature value while the current value of the power signal for charging the battery 310 is configured to the thermal control current value.

In operation 940, the processor 399 may configure the current value of the power signal for charging the battery 310 to a second charging current value which is lower than the first charging current value but is higher than the thermal control current value as the internal temperature decreases to the second temperature value. For example, when the first charging current value is CCV n−1 of Table 1 or Table 2, the second charging current value may be CCV n.

Figure 10:
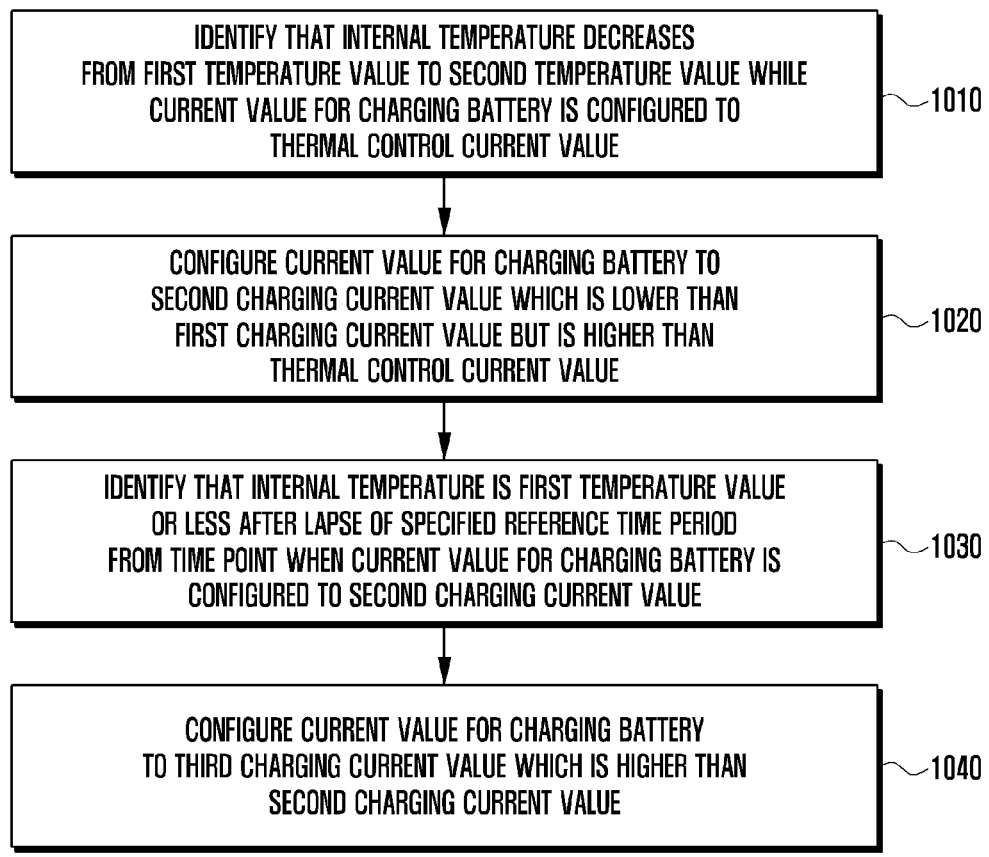
FIG. 10 illustrates operations of a processor for thermal control during charging of a battery in the CC mode according to an embodiment.

FIG. 10 illustrates operations of the processor 399 for thermal control during charging of the battery 310 in the CC mode according to an embodiment.

In operation 1010 (e.g., operation 930), the processor 399 may identify through the temperature sensor 370 that the internal temperature decreases from a first temperature value to a second temperature value while a current value of the power signal for charging the battery 310 is configured to a thermal control current value.

In operation 1020 (e.g., operation 940), the processor 399 may configure the current value of the power signal for charging the battery 310 to a second charging current value which is lower than a first charging current value but is higher than the thermal control current value as the internal temperature decreases to the second temperature value.

In operation 1030, the processor 399 may identify through the temperature sensor 370 that the internal temperature is the first temperature value or less after a lapse of a specified reference time period (e.g., T_recover in FIG. 6 and FIG. 7) from a time point when the current value of the power signal for charging the battery 310 is configured to the second charging current value (e.g., t0 in FIG. 6 and t6 in FIG. 7).

In operation 1040, the processor 399 may configure the current value of the power signal for charging the battery 310 to a third charging current value which is higher than the second charging current value as the internal temperature is the first temperature value or less. According to the embodiment of FIG. 6, the third charging current value may be the first charging current value. According to the embodiment of FIG. 7, the third charging current value may be 'second charging current value+0.05C' according to an equation in Table 3.

Figure 11:
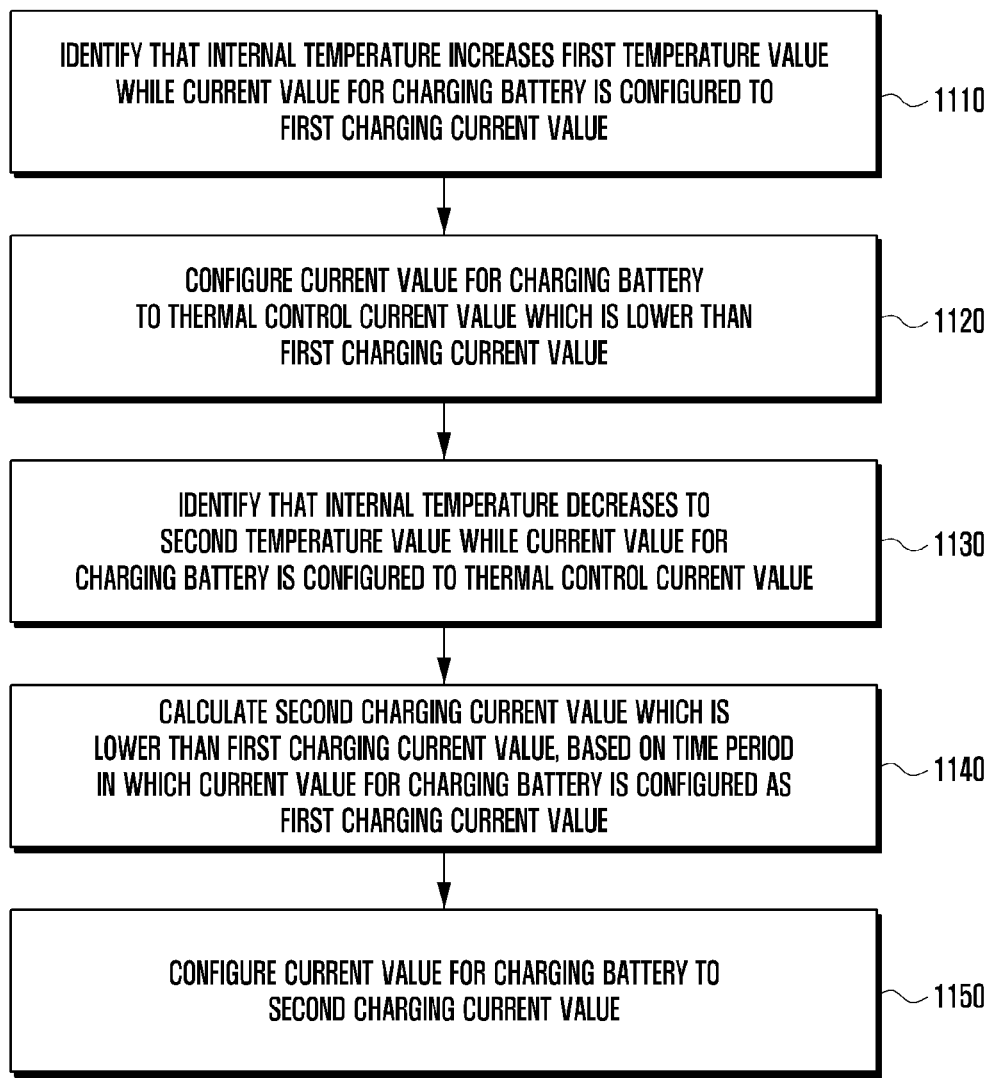
FIG. 11 illustrates operations of a processor for thermal control during charging of a battery in the CC mode according to an embodiment.

FIG. 11 illustrates operations of the processor 399 for thermal control during charging of the battery 310 in the CC mode according to an embodiment.

In operation 1110 (e.g., operation 910), the processor 399 may identify through the temperature sensor 370 that the internal temperature of the electronic device 300 increases a first temperature value while the current value of a power signal for charging the battery 310 is configured to a first charging current value.

In operation 1120 (e.g., operation 920), the processor 399 may configure the current value of the power signal for charging the battery 310 to a thermal control current value which is lower than the first charging current value as the internal temperature increases to the first temperature value.

In operation 1130 (e.g., operation 930), the processor 399 may identify through the temperature sensor 370 that the internal temperature decreases from the first temperature value to a second temperature value while the current value of the power signal for charging the battery 310 is configured to the thermal control current value.

In operation 1140, as the internal temperature decreases to the second temperature value, the processor 399 may calculate a second charging current value which is lower than the first charging current value, based on a time period in which the current value of the power signal for charging the battery 310 is configured as the first charging current value. The time period in which the current value of the power signal for charging the battery 310 is configured as the first charging current value may refer to the non-thermal control mode time period according to the embodiment of FIG. 7. As shown in Table 3, the longer the non-thermal control mode time period is, the greater value the second charging current value may have. In other words, the longer the non-thermal control mode time period is, the smaller the difference between the first charging current value and the second charging current value may be.

In operation 1150, the processor 399 may configure the current value of the power signal for charging the battery 310 to the calculated second charging current value.

In various embodiments, an electronic device (e.g., the electronic device 300 of FIG. 3) may include a battery, a power management circuit configured to charge the battery using a power signal received from an external power supply device wirelessly or via a cable, a temperature sensor, a processor configured to be connected to the temperature sensor and the power management circuit, and a memory configured to be operatively connected to the processor. The memory may store instructions that, when executed, cause the processor to identify through the temperature sensor that an internal temperature of the electronic device increases to a first temperature value while a current value of the power signal for charging the battery is configured to a first charging current value, configure the current value of the power signal for charging the battery to a thermal control current value, which is lower than the first charging current value, as the internal temperature of the electronic device increases to the first temperature value, identify through the temperature sensor that the internal temperature of the electronic device decreases to a second temperature value while the current value of the power signal for charging the battery is configured to the thermal control current value, and configure the current value of the power signal for charging the battery to a second charging current value, which is lower than the first charging current value but is higher than the thermal control current value, as the internal temperature of the electronic device decreases to the second temperature value.

The instructions may cause the processor to configure the current value of the power signal for charging the battery to a third charging current value, which is higher than the second charging current value, when the internal temperature of the electronic device is the first temperature value or less after a lapse of a specified reference time period from a time point when the current value of the power signal for charging the battery is configured to the second charging current value.

The instructions may cause the processor to configure the first charging current value as the current value of the power signal for charging the battery as the third charging current value.

The instructions may cause the processor to configure the third charging current value to be lower than the first charging current value.

The instructions may cause the processor to configure the second charging current value, based on a time period in which the current value of the power signal for charging the battery is configured to the first charging current value.

The instructions may cause the processor to configure the second charging current value in proportion to the time period.

The instructions may cause the processor to configure a current value obtained by subtracting a first value from the first charging current value as the second charging current value when the time period is less than a first time value, and configure a current value obtained by subtracting a second value, which is less than the first value, from the first charging current value as the second charging current value when the time period is greater than the first time value and is less than a second time value.

Before a voltage of the battery reaches a target voltage value, the instructions may cause the processor to perform a thermal control mode of reducing the current value of the power signal for charging the battery to the thermal control current value whenever the internal temperature of the electronic device increases to the first temperature value, and reduce the current value of the power signal for charging the battery to a minimum charging current value by stages whenever the thermal control mode is released due to a decrease in the internal temperature of the electronic device to the second temperature value. The minimum charging current value may be higher than the thermal control current value.

While the battery is charged in a first constant current (CC) mode for increasing a voltage of the battery to a first target voltage value and while the battery is charged in a second CC mode for increasing the voltage of the battery to a second target voltage value higher than the first target voltage value, the instructions may cause the processor to perform a thermal control mode of reducing the current value of the power signal for charging the battery to the thermal control current value whenever the internal temperature of the electronic device increases to the first temperature value, and reduce the current value of the power signal for charging the battery to a minimum charging current value by stages whenever the thermal control mode is released due to a decrease in the internal temperature of the electronic device to the second temperature value. The minimum charging current value may be higher than the thermal control current value. The instructions may cause the processor to reduce the current value of the power signal for charging the battery by stages in a first charging current configuration range and a second charging current configuration range including the minimum charging current value whenever the thermal control mode is released while the battery is charged in the first CC mode, and reduce the current value of the power signal for charging the battery by stages in the second charging current configuration range whenever the thermal control mode is released while the battery is charged in the second CC mode.

In various embodiments, an electronic device (e.g., the electronic device 300 of FIG. 3) may include a battery, a power management circuit configured to charge the battery using a power signal received from an external power supply device wirelessly or via a cable, a temperature sensor, a processor configured to be connected to the temperature sensor and the power management circuit, and a memory configured to be operatively connected to the processor. The memory may store instructions (e.g., instructions to perform the thermal control operation of FIG. 4) that, when executed, cause the processor to perform a thermal control mode of reducing a current value of the power signal for charging the battery from a first charging current value to a thermal control current value according to an internal temperature of the electronic device identified through the temperature sensor being a first temperature value, and release the thermal control mode by increasing the current value of the power signal for charging the battery from the thermal control current value to a second charging current value, which is lower than the first charging current value, according to a decrease in the internal temperature of the electronic device from the first temperature value to a second temperature value, while the battery is charged in a constant current (CC) mode for increasing a voltage of the battery to a target voltage value, and complete charging the battery by blocking a supply of the power signal to the battery when the current value of the power signal for charging the battery decreases to a charging completion current value while the battery is charged in a constant voltage (CV) mode of gradually reducing the current value of the power signal for charging the battery as the voltage of the battery reaches the target voltage value.

The instructions may cause the processor to configure the current value of the power signal for charging the battery to a third charging current value, which is higher than the second charging current value, when the internal temperature of the electronic device is the first temperature value or less after a lapse of a specified reference time period from a time point when the current value of the power signal for charging the battery is configured to the second charging current value.

The instructions may cause the processor to configure the first charging current value as the current value of the power signal for charging the battery as the third charging current value. The instructions may cause the processor to configure the third charging current value to be lower than the first charging current value.

The instructions may cause the processor to configure the second charging current value, based on a time period in which the current value of the power signal for charging the battery is configured to the first charging current value. The instructions may cause the processor to configure the second charging current value in proportion to the time period. The instructions may cause the processor to configure a current value obtained by subtracting a first value from the first charging current value as the second charging current value when the time period is less than a first time value, and configure a current value obtained by subtracting a second value, which is less than the first value, from the first charging current value as the second charging current value when the time period is greater than the first time value and is less than a second time value.

In various embodiments, a method for operating an electronic device (e.g., the method of FIG. 9) may include: charging a battery of the electronic device using a power signal received from an external power supply device to the electronic device, identifying that an internal temperature of the electronic device increases to a first temperature value while a current value of the power signal for charging the battery is configured to a first charging current value, configuring the current value of the power signal for charging the battery to a thermal control current value, which is lower than the first charging current value, as the internal temperature of the electronic device increases to the first temperature value, identifying that the internal temperature of the electronic device decreases to a second temperature value while the current value of the power signal for charging the battery is configured to the thermal control current value, and configuring the current value of the power signal for charging the battery to a second charging current value, which is lower than the first charging current value but is higher than the thermal control current value, as the internal temperature of the electronic device decreases to the second temperature 5 value.

In various embodiments, a method for operating an electronic device may include performing a thermal control mode of reducing a current value of a power signal for charging a battery of the electronic device from a first charging current value to a thermal control current value according to an internal temperature of the electronic device being a first temperature value, and releasing the thermal control mode by increasing the current value of the power signal for charging the battery from the thermal control current value to a second charging current value, which is lower than the first charging current value, according to a decrease in the internal temperature of the electronic device from the first temperature value to a second temperature value, while charging the battery in a constant current (CC) mode for increasing a voltage of the battery to a target voltage value, and completing charging the battery by blocking a supply of the power signal to the battery when the current value of the power signal for charging the battery decreases to a charging completion current value while charging the battery in a constant voltage (CV) mode of gradually reducing the current value of the power signal for charging the battery as the voltage of the battery reaches the target voltage value.

Figure 12:
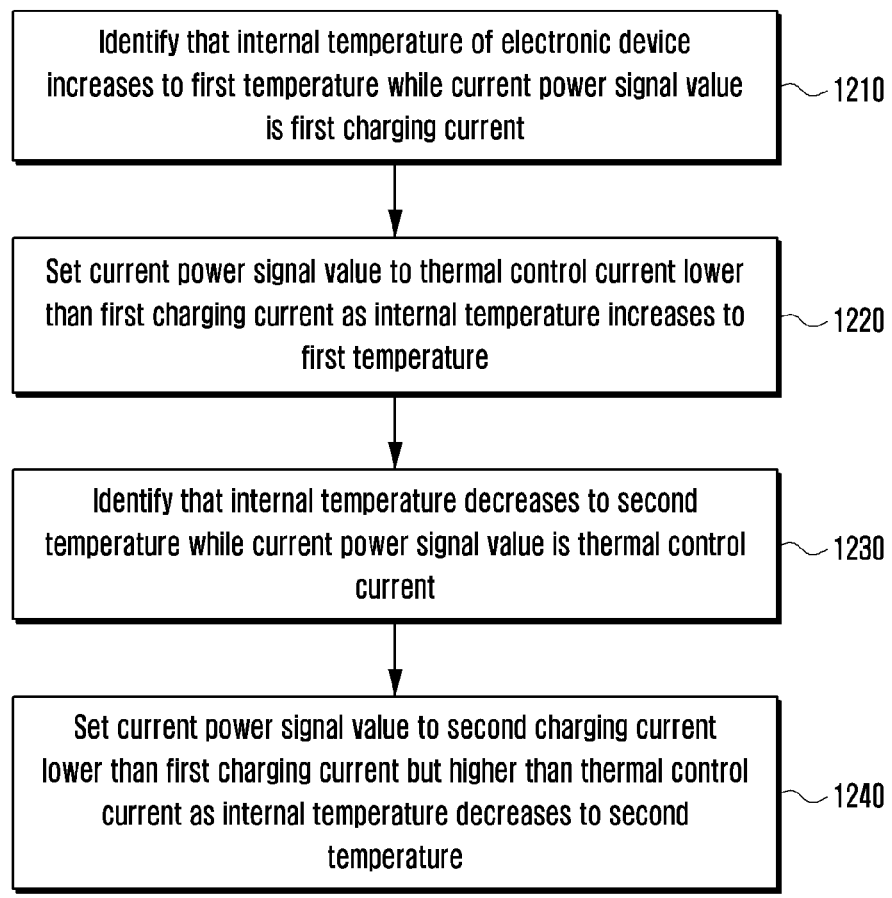
FIG. 12 illustrates operations of a processor for thermal control during charging of a battery in the CC mode according to an embodiment.

With reference to FIG. 12, in various embodiments, a method of operating an electronic device is provided. The electronic device includes a power management circuit configured to charge a battery using a power signal, a processor connected to the power management circuit and a memory connected to the processor. The memory stores instructions that, when executed, cause the processor to execute the following operations. In operation 1210, whether an internal temperature of the electronic device increases to a first temperature while a current power signal value is a first charging current is identified. In operation 1220, the current power signal value is set to a thermal control current lower than the first charging current as the internal temperature increases to the first temperature. In operation 1230, whether the internal temperature decreases to a second temperature while the current power signal value is the thermal control current is identified. In operation 1240, the current power signal value is set to a second charging current lower than the first charging current but higher than the thermal control current as the internal temperature decreases to the second temperature.

Embodiments disclosed in the specification and drawings are merely to provide specific examples in order to easily describe technical content according to the embodiments of the disclosure and to assist understanding of the embodiments of the disclosure and are not intended to limit the scope of the embodiments of the disclosure. Therefore, the scope of various embodiments of the disclosure should be interpreted to include all changes or modifications derived based on the technical idea of various embodiments of the disclosure in addition to the embodiments disclosed herein.

The invention claimed is:

1. An electronic device comprising:
a battery;
a power management circuit configured to charge the battery using a power signal;
a temperature sensor;
a processor; and
a memory,
wherein the memory stores instructions that, when executed, cause the processor to:
based on identifying through the temperature sensor that an internal temperature of the electronic device increases to a first temperature value while a current value of the power signal for charging the battery is configured to a first charging current value,
control the power management circuit to configure the current value of the power signal for charging the battery to a thermal control current value, which is lower than the first charging current value; and
based on identifying through the temperature sensor that the internal temperature of the electronic device decreases to a second temperature value while the current value of the power signal for charging the battery is configured to the thermal control current value,
control the power management circuit to configure the current value of the power signal for charging the battery to a second charging current value, which is lower than the first charging current value but is higher than the thermal control current value.

2. The electronic device of claim 1, wherein the instructions cause the processor to:
control the power management circuit to configure the current value of the power signal for charging the battery to a third charging current value, which is higher than the second charging current value, when the internal temperature of the electronic device is the first temperature value or less after a lapse of a specified reference time period from a time point when the current value of the power signal for charging the battery is configured to the second charging current value.

3. The electronic device of claim 2, wherein the instructions cause the processor to:
control the power management circuit to configure the first charging current value as the current value of the power signal for charging the battery as the third charging current value.

4. The electronic device of claim 2, wherein the instructions cause the processor to:
control the power management circuit to configure the third charging current value to be lower than the first charging current value.

5. The electronic device of claim 1, wherein the instructions cause the processor to:
control the power management circuit to configure the second charging current value, based on a time period in which the current value of the power signal for charging the battery is configured to the first charging current value.

6. The electronic device of claim 5, wherein the instructions cause the processor to:
control the power management circuit to configure the second charging current value in proportion to the time period.

7. The electronic device of claim 6, wherein the instructions cause the processor to:
control the power management circuit to configure a current value obtained by subtracting a first value from the first charging current value as the second charging current value when the time period is less than a first time value; and
control the power management circuit to configure a current value obtained by subtracting a second value, which is less than the first value, from the first charging current value as the second charging current value when the time period is greater than the first time value and is less than a second time value.

8. The electronic device of claim 1, wherein, before a voltage of the battery reaches a target voltage value, the instructions cause the processor to:
perform a thermal control mode of reducing the current value of the power signal for charging the battery to the thermal control current value whenever the internal temperature of the electronic device increases to the first temperature value; and
reduce the current value of the power signal for charging the battery to a minimum charging current value by stages whenever the thermal control mode is released due to a decrease in the internal temperature of the electronic device to the second temperature value, and
wherein the minimum charging current value is higher than the thermal control current value.

9. The electronic device of claim 1, wherein, while the battery is charged in a first constant current (CC) mode for increasing a voltage of the battery to a first target voltage value and while the battery is charged in a second CC mode for increasing the voltage of the battery to a second target voltage value higher than the first target voltage value, the instructions cause the processor to:
perform a thermal control mode of reducing the current value of the power signal for charging the battery to the thermal control current value whenever the internal temperature of the electronic device increases to the first temperature value; and
reduce the current value of the power signal for charging the battery to a minimum charging current value by stages whenever the thermal control mode is released due to a decrease in the internal temperature of the electronic device to the second temperature value, and
wherein the minimum charging current value is higher than the thermal control current value.

10. The electronic device of claim 9, wherein the instructions cause the processor to:
reduce the current value of the power signal for charging the battery by stages in a first charging current configuration range and a second charging current configuration range comprising the minimum charging current value whenever the thermal control mode is released while the battery is charged in the first CC mode; and
reduce the current value of the power signal for charging the battery by stages in the second charging current configuration range whenever the thermal control mode is released while the battery is charged in the second CC mode.

11. An electronic device comprising:
a battery;
a power management circuit configured to charge the battery using a power signal;
a temperature sensor;
a processor; and
a memory,
wherein the memory stores instructions that, when executed, cause the processor to:
perform a thermal control mode of reducing a current value of the power signal for charging the battery from a first charging current value to a thermal control current value according to an internal temperature of the electronic device identified through the temperature sensor being a first temperature value, and release the thermal control mode by increasing the current value of the power signal for charging the battery from the thermal control current value to a second charging current value, which is lower than the first charging current value, according to a decrease in the internal temperature of the electronic device from the first temperature value to a second temperature value, while the battery is charged in a constant current (CC) mode for increasing a voltage of the battery to a target voltage value; and
complete charging the battery by blocking a supply of the power signal to the battery when the current value of the power signal for charging the battery decreases to a charging completion current value while the battery is charged in a constant voltage (CV) mode of gradually reducing the current value of the power signal for charging the battery as the voltage of the battery reaches the target voltage value.

12. The electronic device of claim 11, wherein the instructions cause the processor to:
control the power management circuit to configure the current value of the power signal for charging the battery to a third charging current value, which is higher than the second charging current value, when the internal temperature of the electronic device is the first temperature value or less after a lapse of a specified reference time period from a time point when the current value of the power signal for charging the battery is configured to the second charging current value.

13. The electronic device of claim 12, wherein the instructions cause the processor to:
control the power management circuit to configure the first charging current value as the current value of the power signal for charging the battery as the third charging current value.

14. The electronic device of claim 12, wherein the instructions cause the processor to:
control the power management circuit to configure the third charging current value to be lower than the first charging current value.

15. The electronic device of claim 11, wherein the instructions cause the processor to:
control the power management circuit to configure the second charging current value, based on a time period in which the current value of the power signal for charging the battery is configured to the first charging current value.

16. The electronic device of claim 15, wherein the instructions cause the processor to:
control the power management circuit to configure the second charging current value in proportion to the time period.

17. The electronic device of claim 16, wherein the instructions cause the processor to:
control the power management circuit to configure the current value of the power signal for charging the battery by subtracting a first value from the first charging current value as the second charging current value when the time period is less than a first time value; and
control the power management circuit to configure the current value of the power signal for charging the battery by subtracting a second value, which is less than the first value, from the first charging current value as the second charging current value when the time period is greater than the first time value and is less than a second time value.

18. A method for operating an electronic device, the method comprising:
charging a battery of the electronic device using a power signal;
based on identifying that an internal temperature of the electronic device increases to a first temperature value while a current value of the power signal for charging the battery is configured to a first charging current value;
configuring the current value of the power signal for charging the battery to a thermal control current value, which is lower than the first charging current value; and
baed on identifying that the internal temperature of the electronic device decreases to a second temperature value while the current value of the power signal for charging the battery is configured to the thermal control current value,
configuring the current value of the power signal for charging the battery to a second charging current value, which is lower than the first charging current value but is higher than the thermal control current value.

19. A method for operating an electronic device, the method comprising:
performing a thermal control mode of reducing a current value of a power signal for charging a battery of the electronic device from a first charging current value to a thermal control current value according to an internal temperature of the electronic device being a first temperature value, and releasing the thermal control mode by increasing the current value of the power signal for charging the battery from the thermal control current value to a second charging current value, which is lower than the first charging current value, according to a decrease in the internal temperature of the electronic device from the first temperature value to a second temperature value, while charging the battery in a constant current (CC) mode for increasing a voltage of the battery to a target voltage value; and
completing charging the battery by blocking a supply of the power signal to the battery when the current value of the power signal for charging the battery decreases to a charging completion current value while charging the battery in a constant voltage (CV) mode of gradually reducing the current value of the power signal for charging the battery as the voltage of the battery reaches the target voltage value.

20. An electronic device, comprising:
a power management circuit (PMC) configured to charge a battery using a power signal;
a processor; and
a memory storing instructions that, when executed, cause the processor to:
based on identifying that an internal temperature of the electronic device increases to a first temperature while a current power signal value is a first charging current,
set the current power signal value to a thermal control current lower than the first charging current as the internal temperature increases to the first temperature, and
based on identifying that the internal temperature decreases to a second temperature while the current power signal value is the thermal control current,
set the current power signal value to a second charging current lower than the first charging current but higher than the thermal control current as the internal temperature decreases to the first temperature.

* * * * *